J. ELLIOTT.
PIPE AND FAUCET CLAMP.

No. 85,372. Patented Dec. 29, 1868.

Witnesses:
Wm A Morgan
G. C. Cotton

Inventor:
J. Elliott
per [signature]
Attorneys

JAMES ELLIOTT, OF NEW YORK, N. Y.

Letters Patent No. 85,372, dated December 29, 1868.

IMPROVEMENT IN PIPE AND FAUCET-CLAMP.

The Schedule referred to in these Letters Patent and making part of the same.

*To all whom it may concern:*

Be it known that I, JAMES ELLIOTT, of New York, in the county of New York, and State of New York, have invented a new and useful Improvement in Pipe and Faucet-Clamps for plumbers' use; and I do hereby declare that the following is a full, clear, and exact description thereof, which will enable others skilled in the art to make and use the same, reference being had to the accompanying drawings, forming part of this specification, in which—

Figure 1:
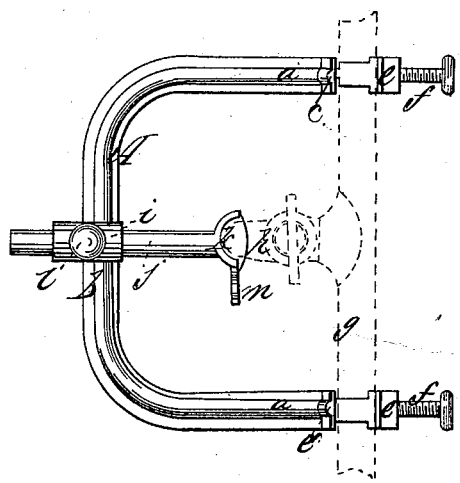
Figure 2:
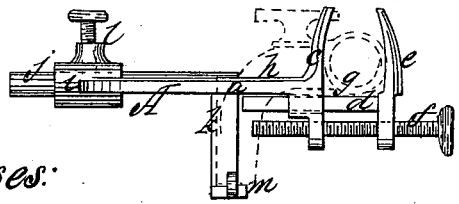

Figure 1 is a plan or top view of my invention.
Figure 2 is a side view of the same.
Similar letters of reference indicate corresponding parts.

This invention relates to a new and improved clamp, designed to facilitate the securing or soldering of faucets in lead pipes, and also in forming the connections of branch-pipes to a main pipe.

In the accompanying sheet of drawings—

A represents a curved bar, having two parallel sides, *a a*, and an end-piece, *b*, the latter being at right angles to the former, as shown in fig. 1.

The ends of the sides *a a*, are each formed with a fixed jaw, *c*, which extends down below its side *a*, and has an opening in it to allow the guide-bar *d* of a sliding jaw, *e*, to pass through. (See fig. 2.)

These sliding jaws *e e* are moved by screws, *f*, which pass through the lower ends of both jaws.

By means of these jaws, the bar A may be firmly clamped to the pipe *g*, (shown in red,) in which the faucet *h* (also shown in red) is to be secured, the end, *b*, of the bar A being parallel with pipe *g*.

At the centre of the end-piece *b*, there is a fixed tubular socket, *i*, in which the cylindrical tong *j* of a bearing, *k*, is fitted, said bearing being secured at a greater or less distance from the end-piece *b*, by means of a set-screw, *l*, which passes through the socket *i*, and bears against the tong.

The pipe *g* has a hole made in it at the proper or desired place, to receive the inner part of the faucet *h*, and the bar A is secured to the pipe *g* by means of the jaws *c e*, and at such points that the bearing *k* will be in line with the faucet.

The inner end of the faucet is then inserted in the hole made in the pipe to receive it, and the bearing *k* adjusted against the outer end of the faucet, and secured in position by the set-screw *l*.

By this means the faucet will be firmly retained in the pipe, and the joint soldered without any trouble or difficulty whatever.

At present, the holding during the soldering-process of the faucet in the pipe is frequently attended with considerable difficulty, which is fully obviated by my invention.

My improvement is also applicable to the soldering of branch in main pipes, in the latter case the branch-pipe resting on a hook-projection, *m*, on bearing *k*.

Having thus described my invention,

I claim as new, and desire to secure by Letters Patent—

The curved bar A, provided with the fixed and sliding jaws *c e*, and the adjustable bearing *k*, all constructed and arranged substantially as shown and described, to form a pipe and faucet-clamp for plumbers' use, as set forth.

JAMES ELLIOTT.

Witnesses:
FRANK BLOCKLEY,
ALEX. F. ROBERTS.